April 7, 1925.   1,532,657

I. FLEISHER

AIR FILTER

Filed Jan. 17, 1922

INVENTOR
Isaac Fleisher
BY
W. T. Criswell
ATTORNEY

Patented Apr. 7, 1925.

1,532,657

UNITED STATES PATENT OFFICE.

ISAAC FLEISHER, OF NEW YORK, N. Y.

AIR FILTER.

Application filed January 17, 1922. Serial No. 530,003.

*To all whom it may concern:*

Be it known that I, ISAAC FLEISHER, a citizen of the United States, and a resident of New York, in the county of New York and State of New York, have invented certain new and useful Improvements in an Air Filter, of which the following is a full, clear, and exact specification.

This invention relates more particularly to a class of devices adapted to be used in the art of painting.

My invention has for its object primarily to provide a device or filter designed to be employed for extracting moisture and oil from the air when fed under pressure to an air brush or spraying apparatus of the class used especially for accomplishing the work of painting and decorating by distributing the mixed liquid paint and the like in the form of a spray so that the moisture and foreign oil with which the compressed air is frequently contaminated will not cause spots and other blemishes to occur in the finished decorations. The invention consists essentially of a substantially parabolic-shaped chamber having an entrance and having an inlet into which compressed air is fed from a source of supply, such as an air tank or an air compressor. An outlet is provided in the chamber for discharging the air to an air brush or spraying apparatus, and the inlet and outlet are relatively arranged so that the air admitted into the chamber will take a circuitous or spiral course for causing the moisture with the fine globules of oil to be freed from the air by tending to condense in the chamber. Also in the chamber between the inlet and outlet is a filter element through which the air is forced in its passage to the outlet for absorbing the remainder of the moisture and oil in the air prior to its delivery through the outlet to the spraying apparatus.

A further object of the invention is to provide an air filter of a simple, efficient and durable construction which may be made in any appropriate size and shape.

With these and other objects in view the invention will be hereinafter more fully described with reference to the accompanying drawing forming a part of this specification in which similar characters of reference indicate corresponding parts in all the views, and will then be pointed out in the claims at the end of the description.

In the drawing, Figure 1 is an elevation of one form of air filter embodying my invention.

Figure 1:
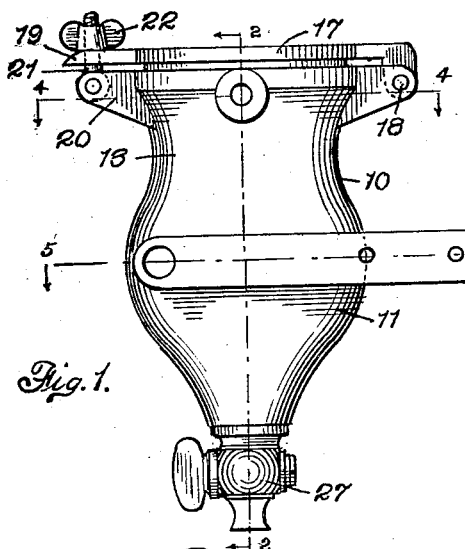
Figure 2:
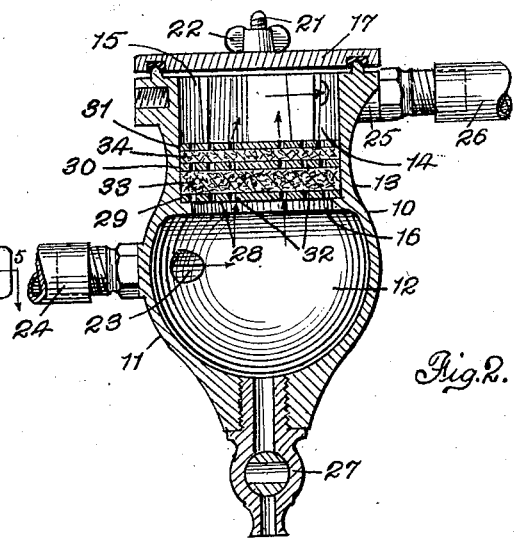
Fig. 2 is a sectional view, partly fragmentary and partly in detail, taken on the line 2—2 of Fig. 1.
Figure 3:
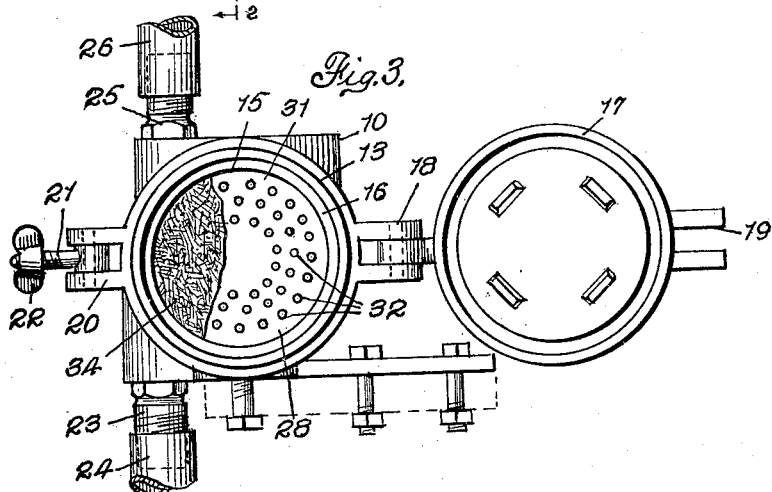
Fig. 3 is a plan, partly fragmentary and partly broken away, of the filter with its cover swung to an open position.
Figure 4:
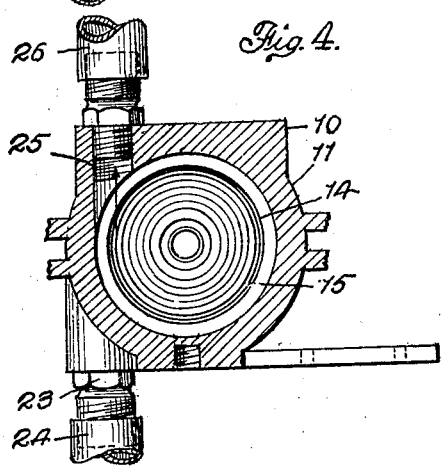
Fig. 4 is a sectional view, partly fragmentary and partly in detail, taken on the line 4—4 of Fig. 1 with the filter element removed therefrom.
Figure 5:
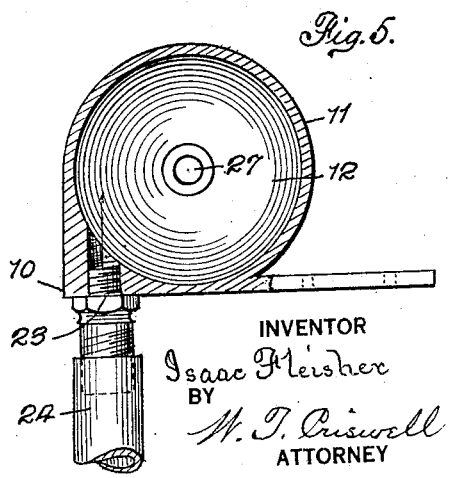
Fig. 5 is a sectional view, partly fragmentary and partly in detail, taken on the line 5—5 of Fig. 1.

The device or air filter has a casing 10 with a lower portion, as 11, of a form to provide in the casing, a lower chamber 12 of substantially a semi-spherical or parabolic shape, and protruding upwardly from the lower portion 11 of the casing is an annular wall 13 to provide an upper chamber 14 which communicates with the lower chamber. The upper open end of the annular wall 13 serves as an entrance 15, and protruding inwardly of the upper chamber 14 from the lower terminal of the wall 13 may be an annular shoulder 16. Adapted to open and close the entrance 15 of the upper chamber 14 is a cover, as 17, which is hinged, at 18, to the wall 13 so that the cover may be swung upwardly and downwardly upon and from the entrance 15. Projecting from part of the cover 17 opposite to the hinge 18 may be a pronged lug, as 19, and extending from the wall 13 under the lug 19 may be another pronged lug 20. Between the prongs of the lug 20 may be pivoted the lower end of a bolt 21 having its upper end threaded so that this threaded end may be swung inwardly and outwardly of the prongs of the lug 19. The bolt 21 is of a length so that its threaded end will protrude above the prongs of the lug 19 when seated therebetween, and on the threaded end of the bolt is a wing nut 22 adapted to be screwed into releasable engagement with the prongs of the nut 19 when it is desired to lock the cover 17 to the casing 10 by detachably fastening the pronged lugs 19 and 20 together.

In the upper part of the wall or lower portion 11 of the casing 10 is an inlet 23 adapted to be connected by means of a nipple to a pipe, as 24, leading from a source of supply of compressed air, such as from an air tank or air compressor, not shown, for delivering air under pressure to the lower chamber 12. In the upper part of the annular wall 13 of the upper chamber 14 is an outlet 25 to which may be connected a pipe, as 26, leading to an air brush or spraying apparatus, not shown, for employing the air to distribute in the form of a spray paint and the like in mixed liquid form for painting and decorating purposes, as is incident to the methods at present in use. When the compressed air is admitted into the chamber 12 through the inlet 23 the air will take a circuitous or spiral course by following the wall of this chamber. The annular shoulder 16 being positioned above this inlet serves to cause the air in the chamber to be deflected from all tendency to take an upward course, and the moisture and oil with which the air is usually charged to considerable extent will be largely extracted by process of condensation. The condensed moisture and oil will then settle on the bottom of the chamber 12 for being drawn or exhausted from the chamber through a valve controlled outlet, as 27, which is provided in the wall of the chamber. The moisture and oil which may remain in the compressed air is further extracted through the medium of a filter element, as 28.

This filter element is preferably composed of a number of metal plates, as 29, 30, 31, all of which are of corresponding circular shapes, and each plate has a number of spaced perforations, as 32. Between the plates 29 and 30 is a disk or pad 33, and between the plates 30 and 31 is another disk or pad 34. Both of the disks 33 and 34 are of felt or other absorbent porous material of circular shapes corresponding to the diameters of the perforated metal plates. These superimposed porous plates and pads are of sizes so that they are removably disposed on the annular shoulder 16 in the upper chamber 14 between the inlet 23 and the outlet 25 of the casing 10. The air in its passage from the lower chamber 12 to the outlet 25 will thereby be forced through the porous plate and through the absorbent pads for effectually filtering from the air all of its moisture and oil prior to discharge from the outlet 25, in order to avoid liability of spotting and blemishing the paint which is sprayed by the use of an air brush.

In the foregoing description, I have embodied the preferred form of my invention, but I do not wish to be understood as limiting myself thereto, as I am aware that modications may be made therein without departing from the principle or sacrificing any of the advantages of this invention, therefore, I reserve to myself the right to make such changes as fairly fall within the scope thereof.

Having thus described my invention, I claim as new and desire to secure by Letters Patent:—

1. An air filter having in combination, a casing with communicating lower and upper chambers, the upper chamber having in its upper part an entrance, a cover hinged to the casing for closing the entrance, means for releasably locking the cover when closed, an outlet pipe leading from the upper chamber adjacent the entrance, said lower chamber of substantially a parabolic shape having in its upper part a tangentially disposed inlet pipe, an annular shoulder protruding inwardly from the wall of the casing at the passage between the chambers and above the inlet pipe of the lower chamber for causing the air to be deflected downwardly in a spiral course in the lower chamber, and moisture absorbing filtering pads on the annular shoulder in the upper chamber and across the passage between the chambers.

2. An air filter having in combination, a casing with communicating lower and upper chambers, the upper chamber having in its upper part an entrance, a cover hinged to the casing for closing the entrance, means for releasably locking the cover when closed, an outlet pipe leading from the upper chamber adjacent the entrance, said lower chamber of substantially a parabolic shape having in its upper part a tangentially disposed inlet pipe, a valve controlled nipple in the lower end of the lower chamber, an annular shoulder protruding inwardly from the wall of the casing at the passage between the chambers and above the inlet pipe of the lower chamber for causing the air to be deflected downwardly in a spiral course in the lower chamber, and alternately lapping porous plates and absorbent fibrous pads removably disposed in the upper chamber on said annular shoulder.

This specification signed and witnessed this 16th day of January, A. D. 1922.

ISAAC FLEISHER.

Witnesses:
SAMUEL FLEISHER,
J. FREDERICK CRYER.